US012661582B2

(12) United States Patent
Tokunaga et al.

(10) Patent No.: US 12,661,582 B2
(45) Date of Patent: Jun. 23, 2026

(54) INFORMATION PROCESSING APPARATUS AND IMAGE GENERATION METHOD

(71) Applicant: SONY INTERACTIVE ENTERTAINMENT INC., Tokyo (JP)

(72) Inventors: Nodoka Tokunaga, Tokyo (JP); Kiyobumi Matsunaga, Tokyo (JP); Masahiro Fujihara, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 343 days.

(21) Appl. No.: 18/361,928

(22) Filed: Jul. 31, 2023

(65) Prior Publication Data
US 2024/0066394 A1 Feb. 29, 2024

(30) Foreign Application Priority Data
Aug. 25, 2022 (JP) ................................. 2022-134457

(51) Int. Cl.
| | |
|---|---|
| *A63F 13/26* | (2014.01) |
| *G06F 3/14* | (2006.01) |
| *G06T 19/00* | (2011.01) |

(52) U.S. Cl.
CPC ............ *A63F 13/26* (2014.09); *G06F 3/1454* (2013.01); *G06T 19/00* (2013.01); *A63F 2300/8082* (2013.01)

(58) Field of Classification Search
CPC .. A63F 13/26; A63F 13/323; A63F 2300/301; A63F 2300/303; A63F 2300/402; A63F 2300/403; A63F 2300/8082; G06F 3/1454
See application file for complete search history.

(56) References Cited

U.S. PATENT DOCUMENTS

| | | | | |
|---|---|---|---|---|
| 8,427,396 | B1 * | 4/2013 | Kim | G02B 27/017 |
| | | | | 345/8 |
| 9,134,949 | B2 * | 9/2015 | Kim | H04N 23/631 |
| 9,310,612 | B2 * | 4/2016 | Cho | H04M 1/72412 |
| 9,448,621 | B2 * | 9/2016 | Reponen | G04G 9/007 |
| 10,460,497 | B1 * | 10/2019 | Steinbach | G06T 19/003 |
| 10,463,962 | B2 * | 11/2019 | Marks | A63F 13/5255 |
| 2006/0082542 | A1 * | 4/2006 | Morita | A61B 5/7475 |
| | | | | 345/156 |
| 2007/0233759 | A1 * | 10/2007 | Tomlinson | G06F 16/40 |
| | | | | 708/200 |
| 2011/0291916 | A1 * | 12/2011 | Arndt | G02B 27/017 |
| | | | | 345/2.2 |
| 2012/0075167 | A1 * | 3/2012 | Lahcanski | G02B 27/017 |
| | | | | 345/8 |

(Continued)

FOREIGN PATENT DOCUMENTS

| | | | | |
|---|---|---|---|---|
| JP | 2006267604 A | * | 10/2006 | |
| JP | 2018094086 A | * | 6/2018 | ......... G06F 3/04815 |

*Primary Examiner* — Steven J Hylinski
(74) *Attorney, Agent, or Firm* — Kilpatrick Townsend & Stockton LLP

(57) ABSTRACT

Disclosed herein is an information processing apparatus including at least one processor that has hardware. The at least one processor generates a first content image in a three-dimensional virtual reality space to be displayed on a head-mounted display, generates a second content image to be displayed on a flat-screen display, and generates a third content image from the first content image and/or the second content image.

20 Claims, 9 Drawing Sheets

130

130

(56)                    References Cited

U.S. PATENT DOCUMENTS

| | | | |
|---|---|---|---|
| 2012/0127284 A1* | 5/2012 | Bar-Zeev | G06T 19/006 |
| | | | 348/158 |
| 2014/0015736 A1* | 1/2014 | Kim | G06F 3/013 |
| | | | 345/1.2 |
| 2014/0062854 A1* | 3/2014 | Cho | G06F 3/016 |
| | | | 345/156 |
| 2015/0243078 A1* | 8/2015 | Watson | G02B 30/34 |
| | | | 345/547 |
| 2020/0066043 A1* | 2/2020 | Graham | A63F 13/428 |

* cited by examiner

100

F I G . 4

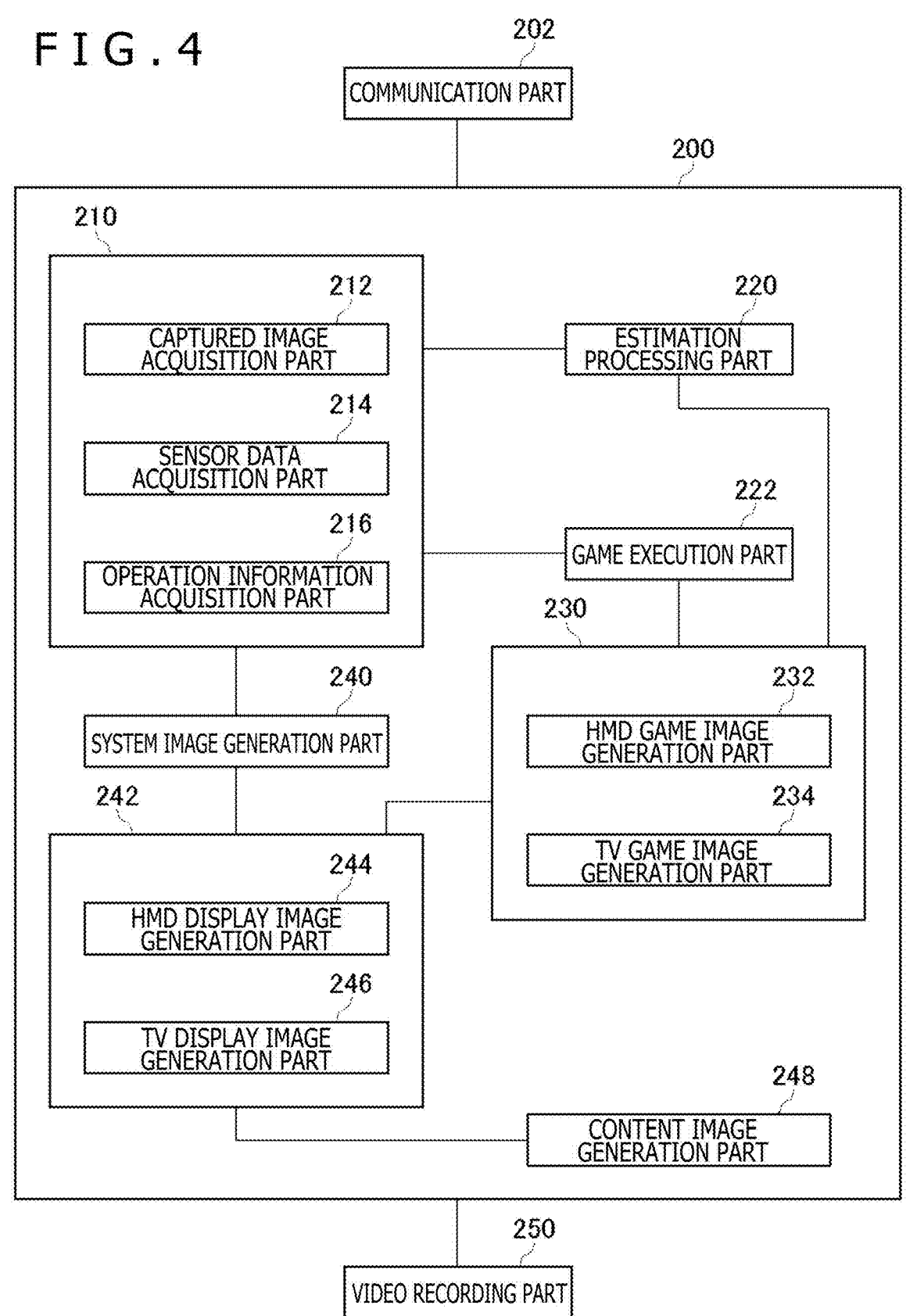

202

COMMUNICATION PART

200

210

212

CAPTURED IMAGE
ACQUISITION PART

214

SENSOR DATA
ACQUISITION PART

216

OPERATION INFORMATION
ACQUISITION PART

220

ESTIMATION
PROCESSING PART

222

GAME EXECUTION PART

230

232

HMD GAME IMAGE
GENERATION PART

234

TV GAME IMAGE
GENERATION PART

240

SYSTEM IMAGE GENERATION PART

242

244

HMD DISPLAY IMAGE
GENERATION PART

246

TV DISPLAY IMAGE
GENERATION PART

248

CONTENT IMAGE
GENERATION PART

250

VIDEO RECORDING PART

10

130

15

330

RECORD GAME PLAY

START RECORDING — 332

◇ RECORD TV GAME IMAGE — 334

◇ RECORD HMD GAME IMAGE — 336

◇ RECORD WHILE SWITCHING BETWEEN HMD GAME IMAGE AND TV GAME IMAGE — 338, 342

◇ RECORD BY MERGING HMD GAME IMAGE AND TV GAME IMAGE — 340

◇ RECORD BOTH HMD GAME IMAGE AND TV GAME IMAGE — 344

130

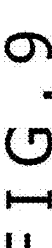
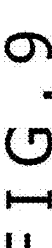
248

INFORMATION PROCESSING APPARATUS AND IMAGE GENERATION METHOD

CROSS REFERENCE TO RELATED APPLICATIONS

This application claims the benefit of Japanese Priority Patent Application JP 2022-134457 filed Aug. 25, 2022, the entire contents of which are incorporated herein by reference.

BACKGROUND

The present disclosure relates to a technology for generating images.

It has been practiced that a user wearing a head-mounted display (also referred to as an "HMD" hereunder) operates a game controller to play a game while viewing game images being displayed on the HMD. When a virtual reality (VR) space image is displayed on the HMD that is being tracked to synchronize the user's head movement with the VR space image, it is possible not only to enhance the sense of immersion in a visual world but also to raise the level of entertainment.

An example of the related art is disclosed in Japanese Patent Laid-open No. 2018-94086.

SUMMARY

It has become general practice to capture game videos and upload what is captured to social networking services (SNS) known as social media or to stream videos of games being played.

It is therefore desirable to implement a technology for easily generating content that may be uploaded or broadcast by users.

According to an embodiment of the present disclosure, there is provided an information processing apparatus including a first image generation part configured to generate a first content image in a three-dimensional virtual reality space to be displayed on a head-mounted display, a second image generation part configured to generate a second content image to be displayed on a flat-screen display, and a third image generation part configured to generate a third content image from the first content image and/or the second content image.

According to another embodiment of the present disclosure, there is provided an image generation method including generating a first content image in a three-dimensional virtual reality space to be displayed on a head-mounted display, generating a second content image to be displayed on a flat-screen display, and generating a third content image from the first content image and/or the second content image.

It is to be noted that suitable combinations of the above constituent elements as well as different modes of the present disclosure obtained by converting the expressions thereof between a method, an apparatus, a program, a system, and a volatile or nonvolatile storage medium that records the program, among others, are also effective as modes of the present disclosure.

BRIEF DESCRIPTION OF THE DRAWINGS

FIG. 4 is a functional block diagram of an information processing apparatus;

FIG. 9 is a diagram depicting an exemplary third content image that merges a first content image and a second content image.

DETAILED DESCRIPTION OF THE PREFERRED EMBODIMENT

Figure 1:
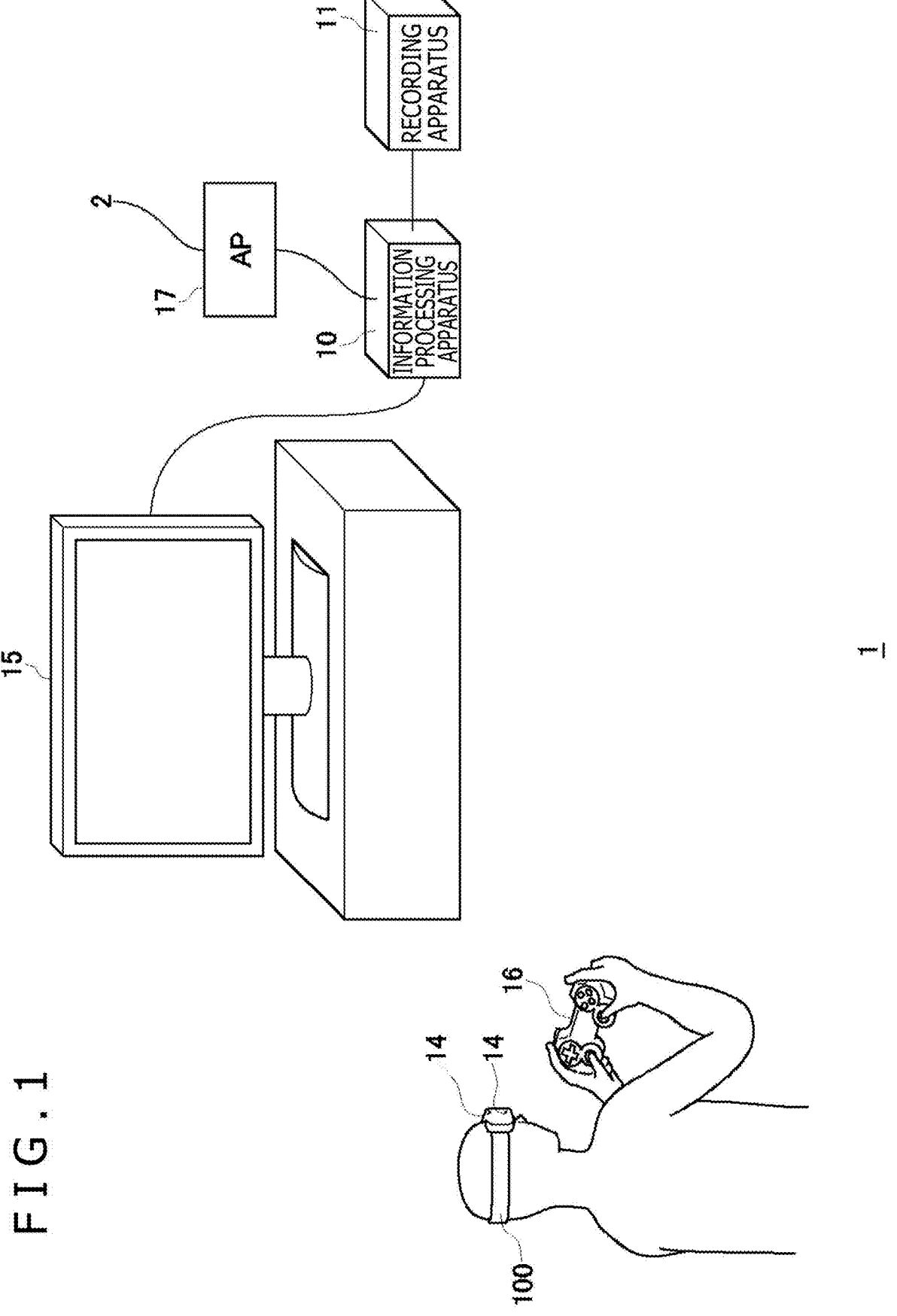
FIG. 1 is a diagram depicting an exemplary configuration of an information processing system according to an embodiment of the present disclosure.

FIG. 1 is a diagram depicting an exemplary configuration of an information processing system 1 according to an embodiment of the present disclosure. The information processing system 1 includes an information processing apparatus 10, a recording apparatus 11, an HMD 100 worn by a user on the head, an input device 16 operated by the user with fingertips, and an output apparatus 15 that outputs images and sounds. The output apparatus 15 is a flat-screen display that may be a floor-standing television (TV) set, a projector that projects images onto a screen or a wall, or a display unit of a tablet terminal or a mobile terminal.

The information processing apparatus 10 is connected to an external network 2 such as the Internet via an access point (AP) 17. The AP 17 has functions of a wireless access point and a router. The information processing apparatus 10 may be connected to the AP 17 by cable or through the use of a known wireless communication protocol. The information processing apparatus 10 may be connected via the network 2 to a server device providing social media and upload captured game videos to the server device or stream videos of currently played games on the server device.

The recording apparatus 11 records applications such as system software and game software. The information processing apparatus 10 may download game software from a game server (not depicted) to the recording apparatus 11 via the network 2. In executing a game program, the information processing apparatus 10 delivers video and audio data of the game to the HMD 100 and to the output apparatus 15. The information processing apparatus 10 and the HMD 100 may be connected with each other by cable or through the use of a known wireless communication protocol.

The HMD 100 is a display apparatus which, worn by the user on the head, displays images on a display panel positioned in front of the user's eyes. The HMD 100 displays a right-eye image and a left-eye image separately on a right-eye display panel and a left-eye display panel, respectively. The two images make up parallax images viewed from the right and left viewpoints to thereby constitute a stereoscopic view. Since the user views the display panels through optical lenses, the information processing apparatus 10 provides the HMD 100 with right-eye and left-eye image data corrected of optical distortions that may be caused by the lenses.

Whereas the user wearing the HMD 100 has no need for the output apparatus 15, the output apparatus 15 outputting an image allows other users to view the displayed image thereon. The information processing apparatus 10 may cause the output apparatus 15 to display either the same image being viewed by the user wearing the HMD 100 or an image different from the image on the HMD 100.

The embodiment provides two display modes: a separate mode in which an image different from the display image on the HMD 100 is displayed on the output apparatus 15, and a mirroring mode in which the same image on the HMD 100 is displayed on the output apparatus 15. The game software for the embodiment has a function of separately generating the image for the HMD 100 and that for the output apparatus 15. It is up to the game software, i.e., up to game developers, whether the image for the output apparatus 15 is generated in the separate mode or in the mirroring mode. For the embodiment, the image for the output apparatus 15 is assumed to be generated in the separate mode.

The information processing apparatus 10 and the input device 16 may be connected with each other by cable or through the use of a known wireless communication protocol. The input device 16 is equipped with multiple operating members such as operation buttons and arrow keys. While gripping the input device 16, the user operates the operating members with fingertips. When the information processing apparatus 10 executes a game program, the input device 16 is used as a game controller.

The HMD 100 is equipped with multiple imaging devices 14. The multiple imaging devices 14 are attached to different positions on a front surface of the HMD 100. The imaging devices 14 may each have a visible light sensor used in common digital video cameras, such as a charge-coupled device (CCD) sensor or a complementary metal oxide semiconductor (CMOS) sensor. The multiple imaging devices 14 synchronously capture images in front of the user at predetermined intervals (e.g., 60 frames per second) and transmit the captured images to the information processing apparatus 10.

The information processing apparatus 10 has a function of estimating at least either a position or a posture of the HMD 100 based on the images captured of its surroundings. The information processing apparatus 10 may estimate the position and/or the posture of the HMD 100 through simultaneous localization and mapping (SLAM) that permits self-position estimation and environmental map generation at the same time. In the ensuing description, the information processing apparatus 10 is assumed to have the function of estimating both the position and the posture of the HMD 100.

The information processing apparatus 10 estimates an amount of movement of the HMD 100 between time (t−1) and time (t), which are consecutive imaging times, using the images captured by the multiple imaging devices 14 at these times. The information processing apparatus 10 estimates the position and posture of the HMD 100 at time (t) by use of the position and posture of the HMD 100 at time (t−1) and the amount of movement of the HMD 100 between time (t−1) and time (t). The information processing apparatus 10 may derive position information indicative of the position of the HMD 100 as position coordinates in a coordinate system defined in a real space, and derive posture information indicative of the posture of the HMD 100 as directions in the coordinate system defined in the real space. Preferably, the information processing apparatus 10 may derive the position information and posture information regarding the HMD 100 more accurately by additional use of sensor data acquired between time (t−1) and time (t) by a posture sensor attached to the HMD 100.

Figure 2:
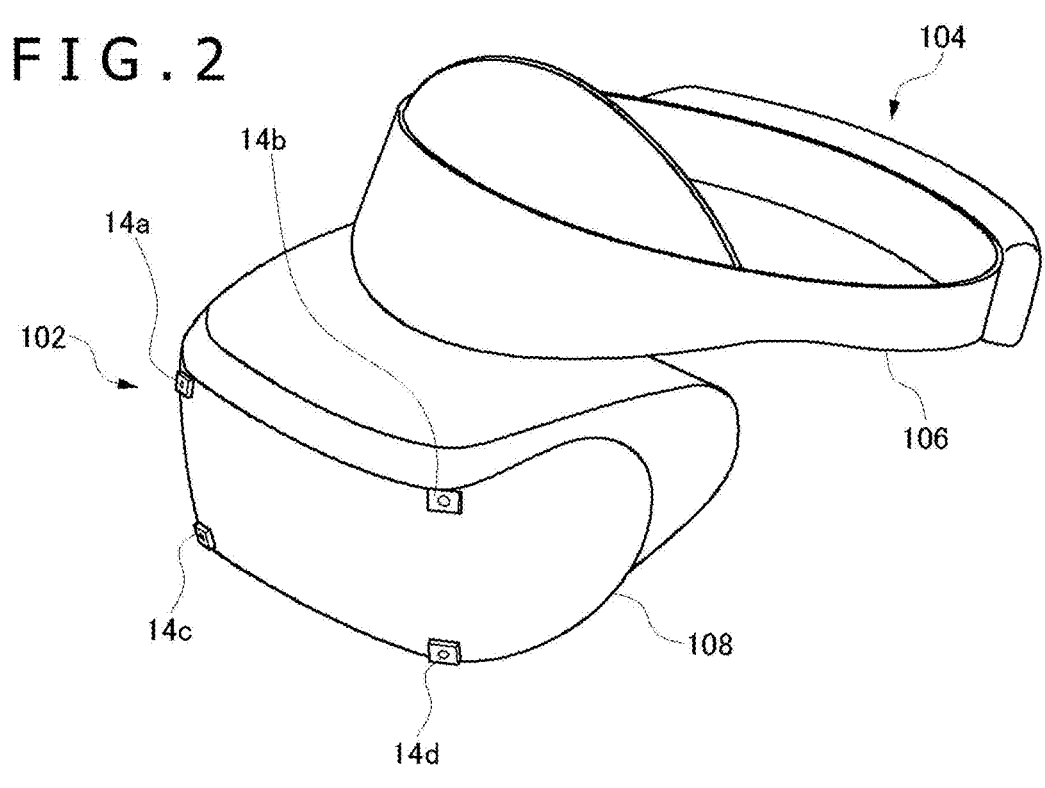
FIG. 2 is a diagram depicting an external shape of an HMD.

FIG. 2 is a diagram depicting an external shape of the HMD 100. The HMD 100 includes an output mechanism part 102 and a wearing mechanism part 104. The wearing mechanism part 104 includes a wearing band 106 worn by the user around the head to secure the HMD 100 thereon. The wearing band 106 includes such a material or such a structure that a band length can be adjusted to fit a circumference of the user's head.

The output mechanism part 102 includes a housing 108 shaped to cover both eyes of the user wearing the HMD 100. Inside the housing 108 is a display panel directly facing the eyes when the HMD 100 is worn. The display panel may be a liquid crystal panel or an organic electroluminescence (EL) panel. Also inside the housing 108 are a pair of right and left optical lenses positioned between the display panel and the user's eyes to expand the user's viewing angle. The HMD 100 may further be equipped with speakers or earphones at positions corresponding to the user's ears or may be connected with external headphones.

Multiple imaging devices 14a, 14b, 14c, and 14d are attached to a front outer surface of the housing 108. With a front direction of the housing 108 taken as a reference, the imaging device 14a is attached to a top right corner of the front outer surface in such a manner as to orient an optical axis of the camera to an upper right. The imaging device 14b is attached to a top left corner of the front outer surface to orient an optical axis of the camera to an upper left. The imaging device 14c is attached to a bottom right corner of the front outer surface to orient an optical axis of the camera to the front. The imaging device 14d is attached to a bottom left corner of the front outer surface to orient an optical axis of the camera also to the front. The imaging devices 14c and 14d constitute a stereo camera.

The HMD 100 transmits the images captured by the imaging devices 14 and the sensor data acquired by the posture sensor to the information processing apparatus 10. Also, the HMD 100 receives game video data and game audio data generated by the information processing apparatus 10.

Figure 3:
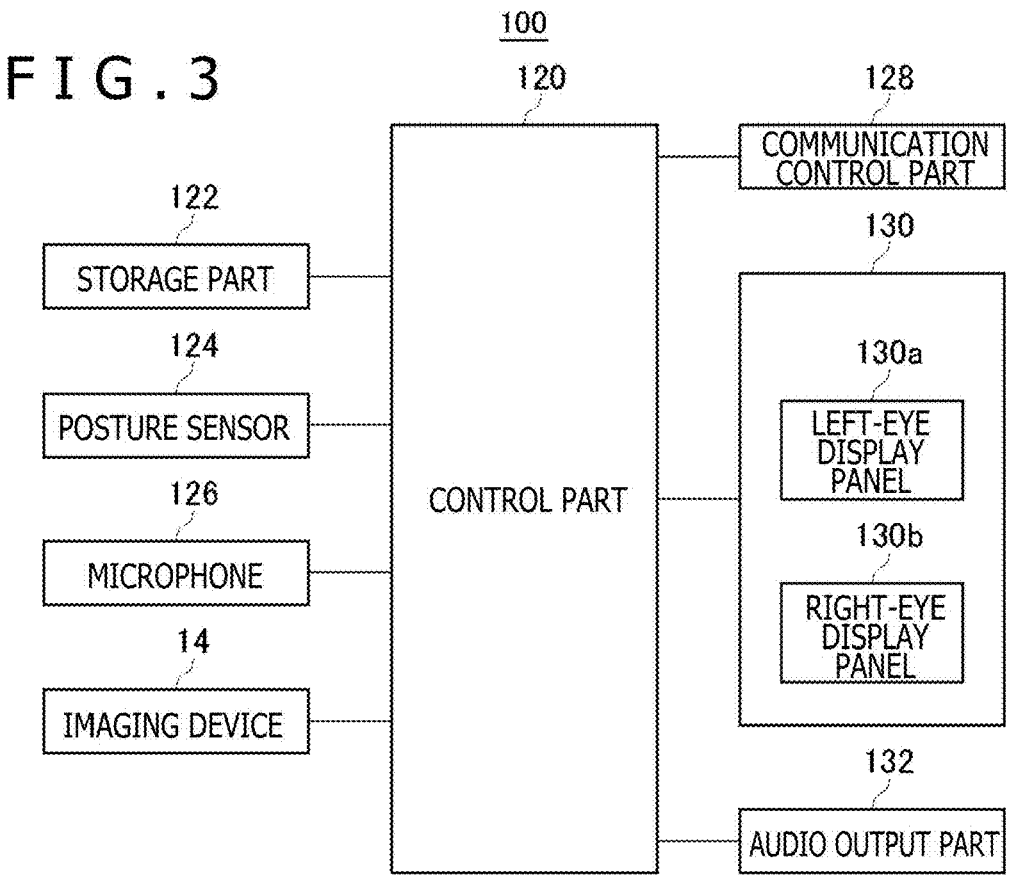
FIG. 3 is a functional block diagram of the HMD.

FIG. 3 depicts functional blocks of the HMD 100. A control part 120 is a main processor that processes and outputs various kinds of data such as video data, audio data, and sensor data, as well as instructions. A storage part 122 temporarily stores the data and instructions processed by the control part 120. A posture sensor 124 acquires sensor data regarding the movement of the HMD 100. The posture sensor 124 may be an inertial measurement unit (IMU) that includes at least a three-axis acceleration sensor and a three-axis gyro sensor for detecting values of coordinate axis components (i.e., sensor data) in predetermined cycles (e.g., of 1,600 Hz).

A communication control part 128 transmits the data output from the control part 120 to the external information processing apparatus 10 in a wired or wireless manner via a network adapter or an antenna. Also, the communication control part 128 receives data from the information processing apparatus 10 and outputs the received data to the control part 120.

Upon receipt of the game video data and game audio data from the information processing apparatus 10, the control part 120 delivers the received data to a display panel 130 for video display and to an audio output part 132 for audio output. The display panel 130 includes a left-eye display panel 130a and a right-eye display panel 130b and displays a pair of parallax images on the two display panels. Also, the control part 120 causes the communication control part 128 to transmit to the information processing apparatus 10 the sensor data acquired by the posture sensor 124, the audio data acquired by a microphone 126, and the images captured by the imaging devices 14.

FIG. 4 depicts functional blocks of the information processing apparatus 10. The information processing apparatus 10 includes a processing part 200 and a communication part 202. The processing part 200 includes an acquisition part 210, an estimation processing part 220, a game execution part 222, a game image generation part 230, a system image generation part 240, a display image generation part 242, and a content image generation part 248. The acquisition part 210 includes a captured image acquisition part 212, a sensor data acquisition part 214, and an operation information acquisition part 216. The game image generation part 230 includes an HMD game image generation part 232 and a TV game image generation part 234, the HMD game image generation part 232 generating a three-dimensional VR space game image to be displayed on the HMD 100, the TV game image generation part 234 generating a two-dimensional game image to be displayed on the output apparatus 15. The display image generation part 242 includes an HMD display image generation part 244 and a TV display image generation part 246, the HMD display image generation part 244 generating a three-dimensional VR space image to be displayed on the HMD 100, the TV display image generation part 246 generating a two-dimensional image to be displayed on the output apparatus 15. A video recording part 250, which is configured as part of a recording region of the recording apparatus 11, records content images generated by the user.

The communication part 202 receives operation information transmitted from the input device 16 and delivers the received information to the acquisition part 210. Also, the communication part 202 receives captured images and sensor data sent from the HMD 100 and delivers what is received to the acquisition part 210.

The information processing apparatus 10 includes a computer that executes programs to implement the various functions indicated in FIG. 4. The computer includes as hardware a memory into which to load programs, at least one processor that executes the loaded programs, an auxiliary storage, and other large-scale integrated circuits (LSIs). The processor may include multiple electronic circuits including semiconductor integrated circuits and LSIs. The multiple electronic circuits may be mounted either on a single chip or on multiple chips. The functional blocks indicated in FIG. 4 are implemented through coordination between hardware and software. It will thus be understood by those skilled in the art that these functional blocks can be implemented by hardware alone, by software alone, or by a combination of both in diverse forms.

The captured image acquisition part 212 acquires the images captured by the multiple imaging devices 14 and delivers the acquired images to the estimation processing part 220. On the basis of the captured images, the estimation processing part 220 performs processes to estimate the position and posture of the HMD 100 so as to derive position information and posture information from the estimation. The sensor data acquisition part 214 acquires the sensor data detected by the posture sensor 124 of the HMD 100 and delivers the acquired data to the estimation processing part 220. Preferably, the estimation processing part 220 may use the sensor data to improve the accuracy of estimating the position information and posture information regarding the HMD 100.

Before starting game play, the user wearing the HMD 100 performs initial settings to make the imaging devices 14 capture and register the user's surroundings. In the initialization, the information processing apparatus 10 appropriates a play area for the user to play in (i.e., an area in which the user can move). If the user is about to exceed the play area during game play, the information processing apparatus 10 warns the user of an imminent overstepping of the play area. During game play, the images of the surrounding environment registered during the initialization may be updated periodically through SLAM in order to create the latest environmental map.

The estimation processing part 220 chronologically acquires the images captured by the imaging devices 14 and divides each of the images into grid cells to detect feature points. The estimation processing part 220 associates the feature points in the images captured at time (t−1) with those in the images captured at time (t) to estimate the amount of movement of the feature points between the images captured at the different times. From the amount of movement of the feature points, the estimation processing part 220 estimates the amount of movement of the HMD 100 between time (t−1) and time (t) and adds the estimated amount of movement to the position and posture of the HMD 100 at time (t−1), thereby estimating the position information and posture information regarding the HMD 100 at time (t). The estimated position information and posture information regarding the HMD 100 are delivered to the game image generation part 230 or to the game execution part 222.

The operation information acquisition part 216 acquires the operation information sent from the input device 16 and delivers the acquired information to the game execution part 222. On the basis of the operation information from the input device 16, the game execution part 222 executes the game program to perform arithmetic processing in order to move a player character, which is operated by the user in a three-dimensional VR space, and non-player characters (NPCs).

The game image generation part 230 includes a graphics processing unit (GPU) that performs rendering and other processes. Given the result of the arithmetic processing in the VR space, the game image generation part 230 generates a game image seen from virtual camera positions in the VR space. Although not depicted, the information processing apparatus 10 includes a sound generation part that generates game sounds.

On the basis of the position information and posture information regarding the HMD 100, the HMD game image generation part 232 generates the game image in the three-dimensional VR space to be displayed on the HMD 100. The HMD game image generation part 232 may handle the position information and posture information delivered from the estimation processing part 220 as a viewpoint position and a line-of-sight direction of the user so as to convert the user's viewpoint position and line-of-sight direction into the viewpoint position and line-of-sight direction of the player character operated by the user. At this time, the HMD game image generation part 232 may align the user's line-of-sight direction with the line-of-sight direction of the player character. The HMD game image generation part 232 generates a three-dimensional VR image. Specifically, the HMD game image generation part 232 generates a pair of parallax images including a left-eye game image and a right-eye game image.

The HMD 100 adopts optical lenses with large curvature so as to display images with a wide viewing angle in front and in a vicinity of the user's eyes. The HMD 100 is configured to let the user look into the display panel 130 through the lenses. Since the use of large-curvature lenses distorts images due to distortion aberration of the lenses, the HMD game image generation part 232 performs a process of distortion correction on rendered images such that the images can be viewed correctly through the large-curvature lenses. That is, the HMD game image generation part 232 generates a left-eye game image and a right-eye game image corrected for the optical distortion attributable to the lenses.

Meanwhile, the TV game image generation part 234 generates two-dimensional game images to be displayed on the flat-screen display such as a TV set. In the separate mode, the TV game image generation part 234 of the embodiment generates game images different from those generated by the HMD game image generation part 232. Specifically, whereas the HMD game image generation part 232 captures game images using virtual cameras aligned with the viewpoint position and line-of-sight direction of the user, the TV game image generation part 234 may capture game images using virtual cameras independent of the user's viewpoint position and line-of-sight direction. That is, the TV game image generation part 234 generates two-dimensional game images captured by virtual cameras different from those used by the HMD game image generation part 232. As a result, a viewing angle of the two-dimensional game image generated by the TV game image generation part 234 is different from the viewing angle of the game image generated by the HMD game image generation part 232.

The system image generation part 240 generates either a system image overlaid on the game image or a system image displayed in place of the game image. When the operation information acquisition part 216 acquires from the user the operation information for displaying the system image, during game play, the system image generation part 240 generates the system image to be overlaid on the game image.

Upon receipt of the game image generated by the game image generation part 230 and the system image generated by the system image generation part 240, the display image generation part 242 generates the image to be displayed on the HMD 100 and the image to be displayed on the output apparatus 15. In the display image generation part 242, the HMD display image generation part 244 generates a three-dimensional VR space image to be displayed on the HMD 100 from the game image generated by the HMD game image generation part 232 (also referred to as an "HMD game image" hereunder) as well as from the system image. The TV display image generation part 246 generates the image to be displayed on the output apparatus 15 from the game image generated by the TV game image generation part 234 (also referred to as a "TV game image" hereunder) and from the system image.

If the user does not input operations to display the system image during game play, the system image generation part 240 will not generate any system image. In the case where the system image generation part 240 does not generate the system image, the HMD display image generation part 244 outputs to the HMD 100 the HMD game image (a pair of parallax images) to be displayed on the HMD 100, and the TV display image generation part 246 outputs to the output apparatus 15 the TV game image to be displayed on the output apparatus 15.

Figure 5:
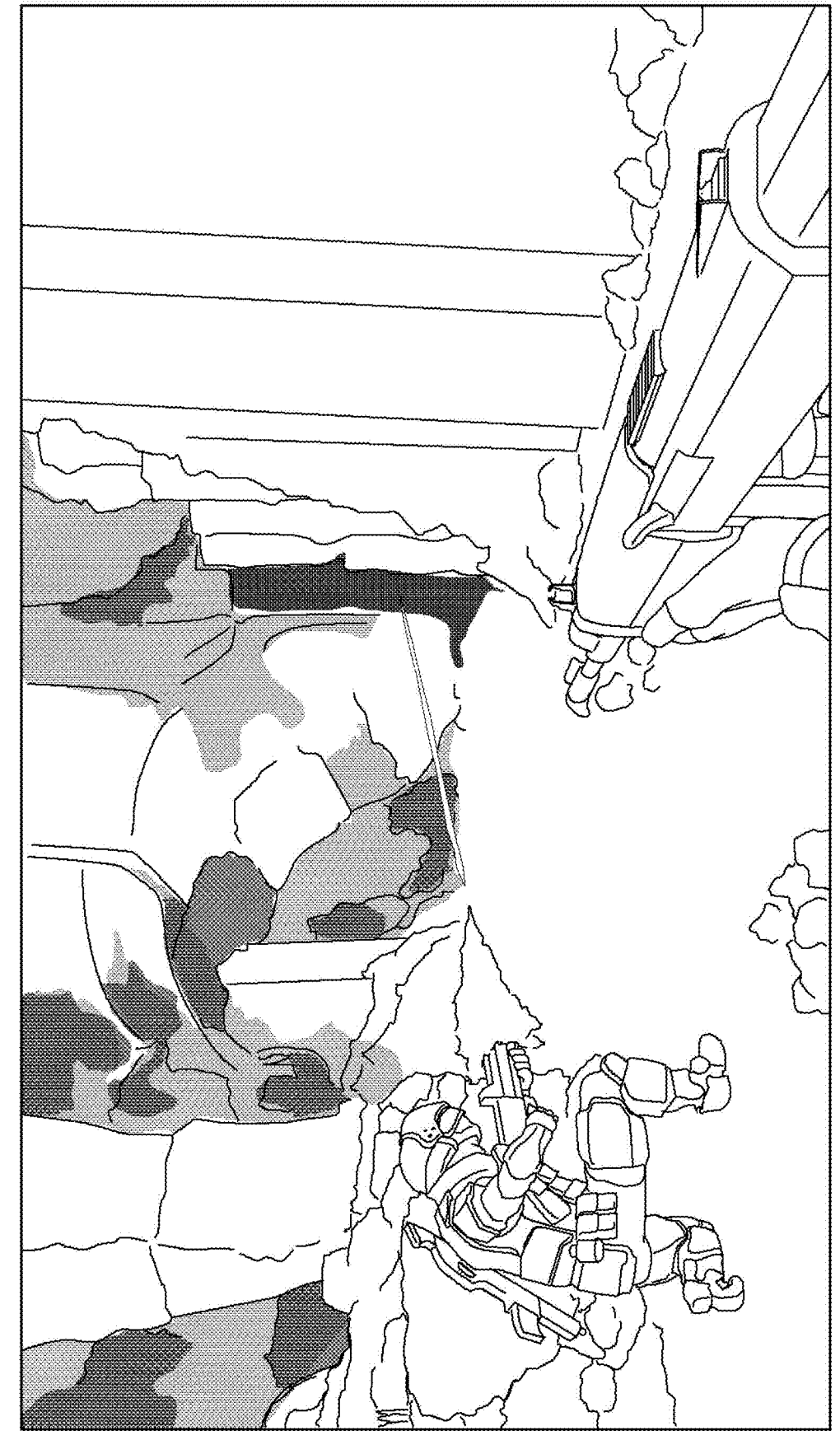
FIG. 5 is a diagram depicting an exemplary game image displayed on a display panel.

FIG. 5 depicts an exemplary game image displayed on the display panel 130 of the HMD 100. As described above, the display panel 130 includes the left-eye display panel 130*a* and the right-eye display panel 130*b*. The control part 120 causes the left-eye game image and the right-eye game image to be displayed on the left-eye display panel 130*a* and the right-eye display panel 130*b*, respectively.

Figure 6:
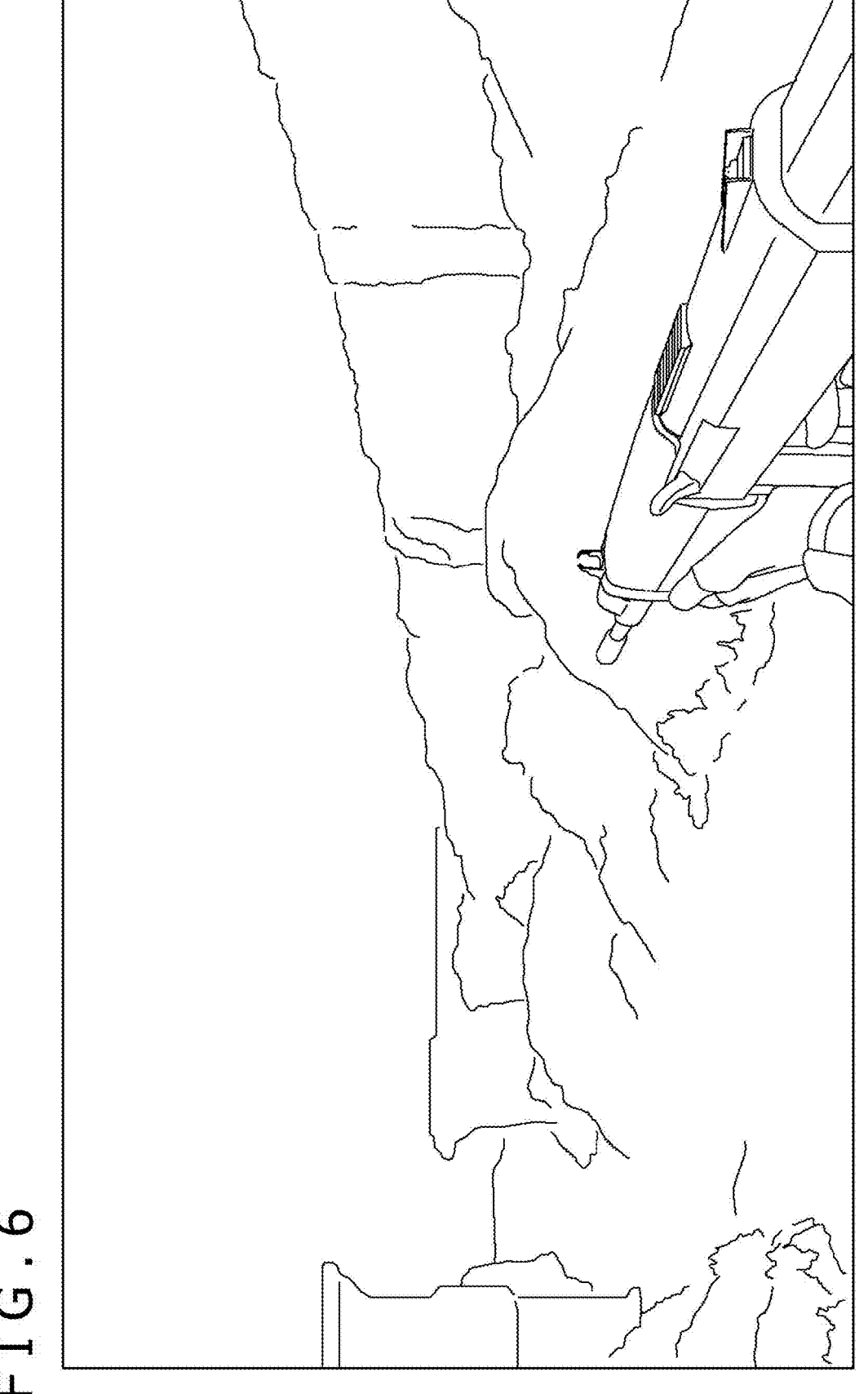
FIG. 6 is a diagram depicting an exemplary game image displayed on an output apparatus.

FIG. 6 depicts an exemplary game image displayed on the output apparatus 15. In the separate mode, the output apparatus 15 displays a game image different from the game image displayed on the display panel 130 (see FIG. 5).

When the user presses a predetermined button (i.e., create button) of the input device 16 during game play, the operation information acquisition part 216 acquires the operation information for displaying the system image, and the system image generation part 240 generates the system image that includes multiple menu items regarding the capture and sharing of the game image. The HMD display image generation part 244 overlays the system image on the HMD game image, and the TV display image generation part 246 overlays the system image on the TV game image.

Figure 7:
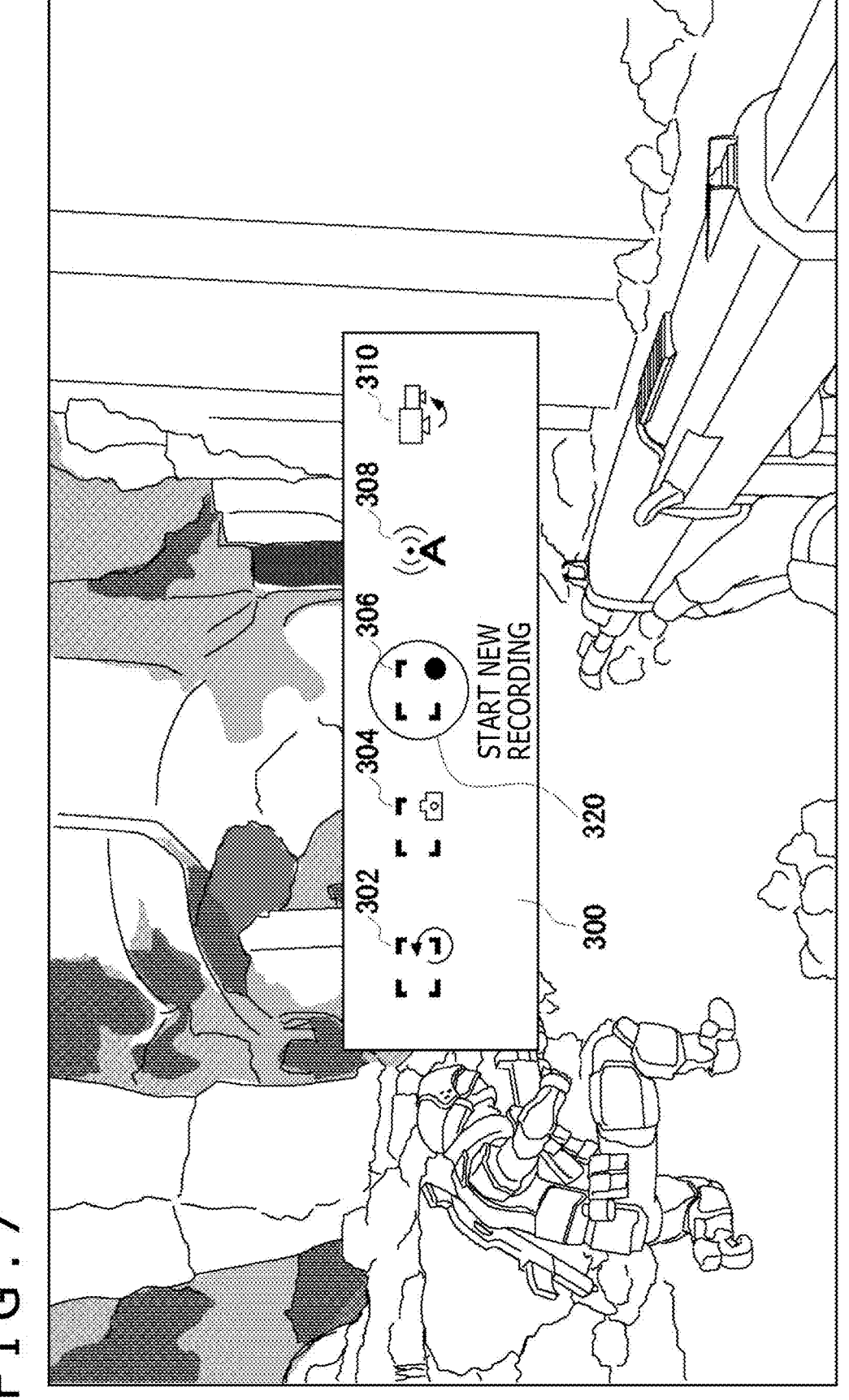
FIG. 7 is a diagram depicting an exemplary system image displayed on the display panel.

FIG. 7 depicts an exemplary system image 300 displayed on the display panel 130. The system image 300 includes multiple menu items regarding the capture and sharing of images. What follows is an explanation of each of the menu items.

Menu Item 302

This menu item is for "saving the latest game play." In default, the latest game play of up to 60 minutes recorded in a ring buffer is saved. By setting a save period of time, the user may save the latest game play of up to 15 seconds or 30 seconds, for example.

Menu Item 304

This menu item is for "capturing a screen shot."

Menu Item 306

This menu item is for "starting new recording." During video recording, a red circular mark and an indication of an elapsed period of time from the start of recording are displayed in an upper part of the screen.

Menu Item 308

This menu item is for starting "broadcast."

Menu Item 310

This menu item is for staring "share-screen." The user can share game play with party members.

The user selects one of the menu items by moving a selection frame 320 onto the position of the desired menu item. In the example in FIG. 7, the selection frame 320 is placed on the menu item 306 to "start new recording." When the user presses an OK button of the input device 16, the operation information acquisition part 216 acquires the operation information for selecting the menu item 306. The operation information for selecting the menu item 306 is the operation information for recording a game video. With the menu item 306 selected, the system image generation part 240 generates a system image for selecting the recording target.

Figure 8:
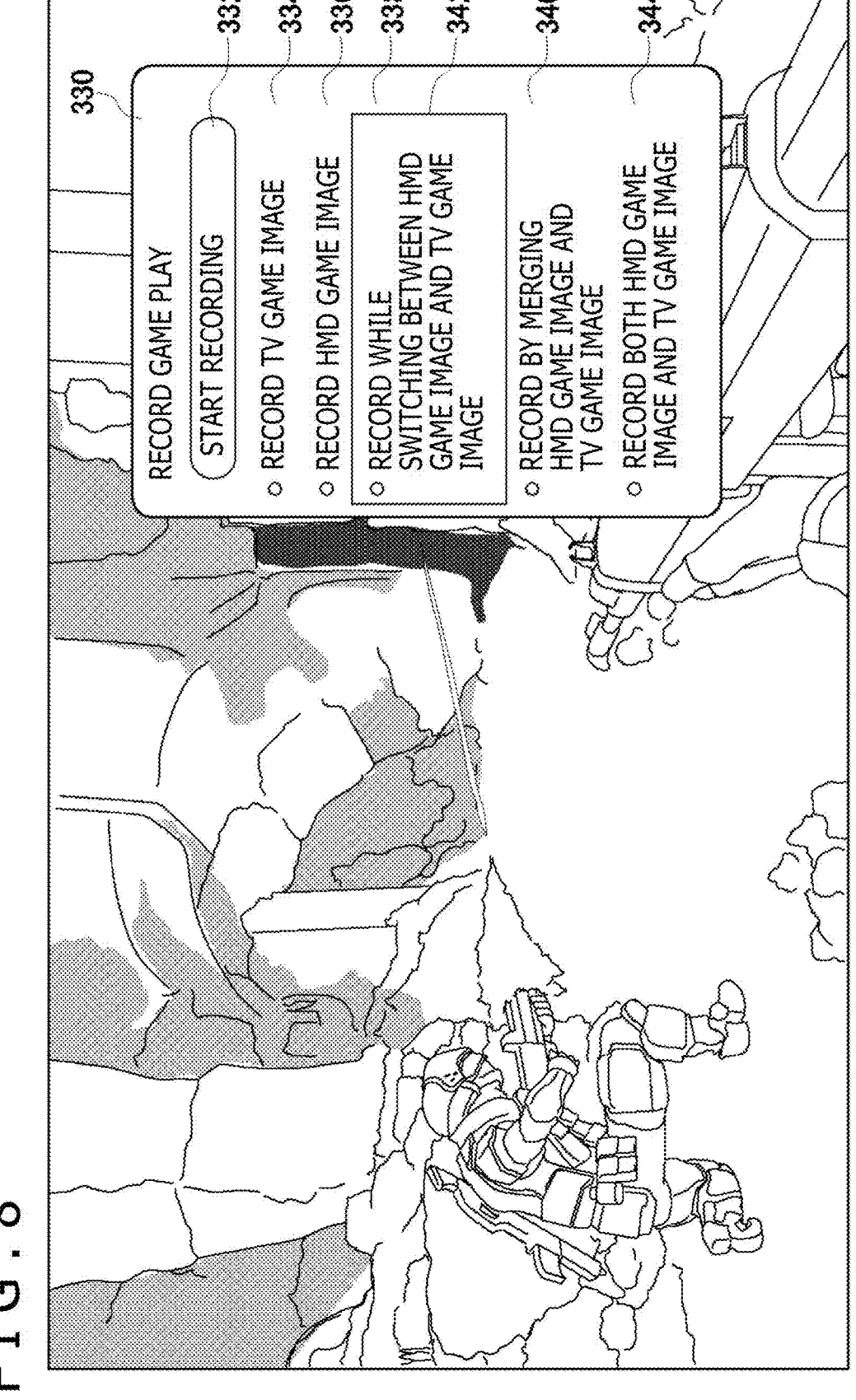
FIG. 8 is a diagram depicting another exemplary system image displayed on the display panel.

FIG. 8 depicts an exemplary system image 330 displayed on the display panel 130. When the operation information acquisition part 216 acquires the operation information for selecting a game play recording item (i.e., menu item 306) included in the system image 300, the system image generation part 240 generates the system image 330 for presenting multiple options for the recording target. The HMD display image generation part 244 overlays the system image 330 on the HMD game image in order to present the multiple options. The system image 330 includes the following multiple options (menu items):

Menu Item 334

This menu item is for selecting recording of the TV game image.

Menu Item 336

This menu item is for selecting recording of the HMD game image.

Menu Item 338

This menu item is for selecting recording while switching between the HMD game image and the TV game image.

Menu Item 340

This menu item is for selecting recording by merging the HMD game image and the TV game image.

Menu Item 344

This menu item is for selecting recording of both the HMD game image and the TV game image.

The user selects the recording target by moving a selection frame 342 onto the position of the desired menu item. In the example in FIG. 8, the selection frame 342 is placed on the menu item 338 to select "recording while switching between the HMD game image and the TV game image." With the information processing apparatus 10 of the embodiment, the user can select the recording target while wearing the HMD 100. When the user operates a recording start button 332, the operation information acquisition part 216 acquires the operation information indicative of the operation on the recording start button 332, and the content image generation part 248 records the selected recording target.

The content image generation part 248 in the embodiment generates the content image from the image generated by the HMD display image generation part 244 and/or from the image generated by the TV display image generation part 246. The content image generation part 248 records the generated content image to the video recording part 250. What follows is an explanation of the content image generated when each of the menu items is selected.

<Where the Menu Item 334 is Selected>

With the menu item 334 selected, operating the recording start button 332 causes the content image generation part 248 to record as the content image the image generated by the TV display image generation part 246. Whereas the HMD game image is corrected for optical distortion, the TV game image is not corrected in that respect. For this reason, selecting the TV game image as the recording target makes it possible to record a high-quality content image. In this case, the content image generation part 248 need not record exactly the same image as that generated by the TV display image generation part 246; the content image generation part 248 may instead record the content image in diverse formats such as in the form of an image with its aspect ratio changed.

<Where the Menu Item 336 is Selected>

With the menu item 336 selected, operating the recording start button 332 causes the content image generation part 248 to record as the content image the image generated by the HMD display image generation part 244. Since the HMD game image is a game image in which the user has actually played, recording the HMD game image and uploading it to the server device providing social media allows viewing users to have the same game experience as the user. With the HMDs becoming prevalent among the viewing users, there will be an increasing demand for viewing the HMD game image. In this case, the content image generation part 248 need not record as the content image exactly the same image as that generated by the HMD display image generation part 244; the content image generation part 248 may record the content image in diverse formats with its aspect ratio changed, with distortion correction carried out, or with chromatic aberration corrected, for example.

<Where the Menu Item 338 is Selected>

With the menu item 338 selected, operating the recording start button 332 causes the content image generation part

248 to switch between the image generated by the HMD display image generation part 244 (also referred to as a "first content image" hereunder) and the image generated by the TV display image generation part 246 (also referred to as a "second content image" hereunder) halfway through in recording one content image (also referred to as a "third content image" hereunder). The content image generation part 248 may switch between the first content image and the second content image at predetermined time intervals in generating the third content image. For example, the content image generation part 248 may switch between the first content image and the second content image at intervals of 30 seconds in recording one video (third content image).

<Where the Menu Item 340 is Selected>

With the menu item 340 selected, operating the recording start button 332 causes the content image generation part 248 to merge the image generated by the HMD display image generation part 244 (first content image) and the image generated by the TV display image generation part 246 (second content image) to record one video (third content image).

<Where the Menu Item 344 is Selected>

With the menu item 344 selected, operating the recording start button 332 causes the content image generation part 248 to record both the image generated by the HMD display image generation part 244 (first content image) and the image generated by the TV display image generation part 246 (second content image) each as a separate content image (third content image).

FIG. 9 is a diagram depicting an exemplary third content image that merges the first content image and the second content image. In this example, the first content image arranged on the right is the HMD game image, and the second content image arranged on the left is the TV game image. The content image generation part 248 records the HMD game image and the TV game image as one video (third content image). Since the embodiment corrects the HMD game image for optical distortion, the content image generation part 248 may convert the HMD game image back to the pre-correction state for the sake of recording.

In the case where the recording start button 332 is operated with the menu item 334 or 336 selected, the user may change the recording target by operating suitable buttons of the input device 16 during recording. By changing the recording target at a desired timing, the user can switch between the HMD game image and the TV game image, depending on the game scene, in generating the content image.

In the system image 300 in FIG. 7, the user may place the selection frame 320 onto the menu item 308 and press the OK button of the input device 16. This causes the operation information acquisition part 216 to acquire the operation information for selecting the menu item 308. The operation information for selecting the menu item 308 is the operation information for broadcasting the game image. Selecting the menu item 308 causes the system image generation part 240 to generate the system image for selecting a broadcast target.

Figure 10:
FIG. 10 is a diagram depicting another exemplary system image displayed on the display panel.

FIG. 10 depicts an exemplary system image 350 displayed on the display panel 130. When the operation information acquisition part 216 acquires the operation information for selecting a game image broadcast item (i.e., menu item 308) included in the system image 300, the system image generation part 240 generates the system image 350 for presenting multiple options for the broadcast target. The HMD display image generation part 244 overlays the system image 350 on the HMD game image to present the multiple options. The system image 350 includes the following options (menu items):

Menu Item 354

This menu item is for selecting broadcast of the TV game image.

Menu Item 356

This menu item is for selecting broadcast of the HMD game image.

Menu Item 358

This menu item is for selecting broadcast while switching between the HMD game image and the TV game image.

Menu Item 360

This menu item is for selecting broadcast by merging the HMD game image and the TV game image.

Menu Item 362

This menu item is for selecting broadcast of both the HMD game image and the TV game image.

The user selects the broadcast target by moving the selection frame 342 onto the position of the desired menu item. In the example in FIG. 10, the selection frame 342 is placed on the menu item 358 to select "broadcast while switching between the HMD game image and the TV game image." With the information processing apparatus 10 of the embodiment, the user can select the broadcast target while wearing the HMD 100. When the user operates a broadcast start button 352, the operation information acquisition part 216 acquires the operation information indicative of the operation on the broadcast start button 352, and the content image generation part 248 delivers the selected broadcast target through the communication part 202 to the server device providing social media.

The content image generation part 248 in the embodiment generates the content image from the image generated by the HMD display image generation part 244 and/or from the image generated by the TV display image generation part 246. The content image generation part 248 delivers the generated content image to the server device. What follows is an explanation of the content image generated when each of the menu items is selected.

<Where the Menu Item 354 is Selected>

With the menu item 354 selected, operating the broadcast start button 352 causes the content image generation part 248 to broadcast as the content image the image generated by the TV display image generation part 246. Whereas the HMD game image is corrected for optical distortion, the TV game image is not corrected in that respect. For this reason, selecting the TV game image as the broadcast target makes it possible to broadcast a high-quality content image. In this case, the content image generation part 248 need not broadcast exactly the same image as that generated by the TV display image generation part 246; the content image generation part 248 may instead broadcast the content image in diverse formats such as in the form of an image with its aspect ratio changed.

<Where the Menu Item 356 is Selected>

With the menu item 356 selected, operating the broadcast start button 352 causes the content image generation part 248 to broadcast as the content image the image generated by the HMD display image generation part 244. Since the HMD game image is a game image in which the user has actually played, broadcasting the HMD game image as the broadcast target allows viewing users to have the same game experience as the user. In this case, the content image generation part 248 need not broadcast as the content image exactly the same image as that generated by the HMD display image generation part 244; the content image generation part 248 may broadcast the content image in diverse formats with its aspect ratio changed, with distortion correction carried out, or with chromatic aberration corrected, for example.

<Where the Menu Item 358 is Selected>

With the menu item 358 selected, operating the broadcast start button 352 causes the content image generation part 248 to switch between the image generated by the HMD display image generation part 244 (first content image) and the image generated by the TV display image generation part 246 (second content image) halfway through in broadcasting one content image (also referred to as the "third content image" hereunder). The content image generation part 248 may switch between the first content image and the second content image at predetermined time intervals in generating the third content image. For example, the content image generation part 248 may switch between the first content image and the second content image at intervals of 30 seconds in broadcasting one video (third content image).

<Where the Menu Item 360 is Selected>

With the menu item 360 selected, operating the broadcast start button 352 causes the content image generation part 248 to merge the image generated by the HMD display image generation part 244 (first content image) and the image generated by the TV display image generation part 246 (second content image) to broadcast one video (third content image).

<Where the Menu Item 362 is Selected>

With the menu item 362 selected, operating the broadcast start button 352 causes the content image generation part 248 to broadcast both the image generated by the HMD display image generation part 244 (first content image) and the image generated by the TV display image generation part 246 (second content image) each as a separate content image (third content image).

In the case where the broadcast start button 352 is operated with the menu item 354 or 356 selected, the user can change the broadcast target by operating suitable buttons of the input device 16 during broadcast. By changing the broadcast target at a desired timing, the user can switch between the HMD game image and the TV game image, depending on the game scene, in generating and broadcasting the content image.

The present disclosure has been described above in conjunction with a specific embodiment. It is to be understood by those skilled in the art that suitable combinations of the constituent elements and of various processes of the embodiment described above as examples will lead to further variations of the present disclosure and that such variations also fall within the scope of this disclosure. Whereas the embodiment has been discussed in connection with the processes for recording or broadcasting the game images, the present disclosure can also be applied to processes for recording or broadcasting content images other than the game images.

In the above-described embodiment, the HMD game image generation part 232 generates the HMD game image based on the viewpoint position and line-of-sight direction of the user. Alternatively, the HMD game image may be generated solely on the basis of the user's line-of-sight direction.

It has been explained that the above embodiment allows the user to display the system image 300 and that the user can select the recording target or the broadcast target by selecting the menu items in the displayed system image 300. Alternatively, in the case where the input device 16 is a keyboard, a keyboard shortcut may be assigned to each of the options for the recording target or the broadcast target. For example, the combination of the PrintScreen+T keys may be assigned to the option of "recording of the TV game image"; the combination of the PrintScreen+H keys may be assigned to the option of "recording of the HMD game image"; the combination of the PrintScreen+B keys may be assigned to the option of "recording while switching between the HMD game image and the TV game image"; the combination of the PrintScreen+Y keys may be assigned to the option of "recording by merging the HMD game image and the TV game image"; and the combination of the PrintScreen+J keys may be assigned to the option of "recording of both the HMD game image and the TV game image." By inputting suitable combinations of keys of the keyboard during game play, the user can record the corresponding recording target. Similar keyboard shortcuts may be assigned to the options for the broadcast target as well.

Further, it has been explained that the above embodiment allows the user to select the recording target or the broadcast target during game play. Alternatively, the user may, regardless of game play, cause the display panel 130 to display a setting menu regarding the information processing apparatus 10 and select the recording target or the broadcast target. The content image generation part 248 may store the selected recording target and broadcast target for the moment and use them as the settings for subsequent recording and broadcast. When that is the case, the user is not required to select the recording target or the broadcast target during game play every time recording or broadcast is to be performed. The preset recording target and/or broadcast target need only be selected automatically to execute the recording processing and/or the broadcast processing. In the case where the recording target is set beforehand and where the user selects the menu item 302 (for saving the latest game play) during game play, the recording target is saved for a predetermined period of time as recorded in the ring buffer.

What is claimed is:

1. An information processing apparatus comprising:
at least one processor that has hardware, the at least one processor being configured to perform operations comprising:
generating a first content image in a three-dimensional virtual reality space to be displayed on a head-mounted display,
generating a second content image to be displayed on a flat-screen display;
displaying a first menu to a user interface of the head-mounted display;
receiving a first selection from the first menu;
based at least in part of the received selection, generating a third content image from at least one of the first content image or the second content image;
displaying a second menu to the user interface of the head-mounted display;
receiving a second selection from the second menu; and
displaying, based at least in part on the second selection, one or more of the first content image, the second content image, and the third content image to one or more of the head-mounted display and the flat-screen display.

2. The information processing apparatus according to claim 1, wherein the at least one processor generates the third content image by switching between the first content image and the second content image while generating the third content image.

3. The information processing apparatus according to claim 1, wherein the at least one processor generates the third content image by merging the first content image and the second content image.

4. The information processing apparatus according to claim 1, wherein the at least one processor presents multiple options for the third content image to be generated.

5. The information processing apparatus according to claim 1, wherein the at least one processor generates the third content image that includes multiple images.

6. An image generation method comprising:
generating a first content image in a three-dimensional virtual reality space to be displayed on a head-mounted display;
generating a second content image to be displayed on a flat-screen display;
displaying a first menu to a user interface of the head-mounted display;
receiving a first selection from the first menu;
based at least in part of the received selection, generating a third content image from at least one of the first content image or the second content image;
displaying a second menu to the user interface of the head-mounted display;
receiving a second selection from the second menu; and
displaying, based at least in part on the second selection, one or more of the first
content image, the second content image, and the third content image to one or more of the head-mounted display and the flat-screen display.

7. A computer program product embodied in a non-transitory recording medium, including instructions configured to cause at least one processor to perform operations, comprising:
generate a first content image in a three-dimensional virtual reality space to be displayed on a head-mounted display;
generate a second content image to be displayed on a flat-screen display;
display a first menu to a user interface of the head-mounted display;
receive a first selection from the first menu;
based at least in part of the received selection, generate a third content image from at least one of the first content image or the second content image;
display a second menu to the user interface of the head-mounted display;
receive a second selection from the second menu; and
display, based at least in part on the second selection, one or more of the first
content image, the second content image, and the third content image to one or more of the head-mounted display and the flat-screen display.

8. The information processing apparatus according to claim 1, wherein the at least one processor merges the first content image and the second content image by arranging them side-by-side within the third content image, such that the first content image is displayed on one portion of the display and the second content image is displayed on a different portion of the display within the third content image.

9. The information processing apparatus according to claim 1, wherein the at least one processor is configured to switch between the first content image and the second content image at predetermined time intervals during generation of the third content image, thereby producing a third content image that alternates between the first and second content images according to a schedule.

10. The information processing apparatus according to claim 1, wherein the at least one processor merges the first content image and the second content image by overlaying at least a portion of the second content image onto the first content image within the third content image.

11. The method of claim 6, wherein the third content image is generated by switching between the first content image and the second content image while generating the third content image.

12. The method of claim 6, wherein the third content image is generated by merging the first content image and the second content image.

13. The method claim 6, further comprising presenting multiple options for the third content image to be generated.

14. The method claim 6, wherein the third content image includes multiple images.

15. The method of claim 6, further comprising the first content image and the second content image by arranging them side-by-side within the third content image, such that the first content image is displayed on one portion of the display and the second content image is displayed on a different portion of the display within the third content image.

16

16. The method of claim 6, further comprising switching between the first content image and the second content image at predetermined time intervals during generation of the third content image, thereby producing a third content image that alternates between the first and second content images according to a schedule.

17. The computer program product of claim 7, wherein the at least one processor generates the third content image by switching between the first content image and the second content image halfway through generating the third content image.

18. The computer program product of claim 7, wherein the at least one processor generates the third content image by merging the first content image and the second content image.

19. The computer program product of claim 7, wherein the at least one processor presents multiple options for the third content image to be generated.

20. The computer program product of claim 7, wherein the at least one processor generates the third content image that includes multiple images.

* * * * *